(12) United States Patent
Humalainen

(10) Patent No.: US 9,016,327 B2
(45) Date of Patent: Apr. 28, 2015

(54) PIPE ASSEMBLY FOR DISTRICT HEATING NETWORK

(75) Inventor: Sampo Humalainen, Mäntyharju (FI)

(73) Assignee: Sampo Humalainen, Mantyharju (FI)

( * ) Notice: Subject to any disclaimer, the term of this patent is extended or adjusted under 35 U.S.C. 154(b) by 0 days.

(21) Appl. No.: 14/122,739

(22) PCT Filed: Jun. 15, 2012

(86) PCT No.: PCT/FI2012/050617
§ 371 (c)(1),
(2), (4) Date: Nov. 27, 2013

(87) PCT Pub. No.: WO2012/172184
PCT Pub. Date: Dec. 20, 2012

(65) Prior Publication Data
US 2014/0096857 A1 Apr. 10, 2014

(30) Foreign Application Priority Data
Jun. 17, 2011 (FI) ...................................... 20115619

(51) Int. Cl.
*F16L 11/12* (2006.01)
*F16L 3/12* (2006.01)
(Continued)

(52) U.S. Cl.
CPC . *F16L 3/12* (2013.01); *F16L 59/15* (2013.01); *F16L 1/00* (2013.01); *F16L 9/19* (2013.01); *Y02E 20/14* (2013.01); *F16L 3/22* (2013.01);
(Continued)

(58) Field of Classification Search
USPC .................. 138/116, 115, 148, 149; 428/36.1
See application file for complete search history.

(56) References Cited

U.S. PATENT DOCUMENTS 2,773,513 A 12/1956 Isenberg
3,269,422 A * 8/1966 Matthews et al. ............. 138/111
(Continued)

FOREIGN PATENT DOCUMENTS

CN 201593668 U 9/2010
DE 19632991 C1 1/1998
(Continued)

OTHER PUBLICATIONS

International Search Report and Written Opinion, corresponding International Application No. PCT/FI2012/050617, mailing date Nov. 6, 2012.
(Continued)

*Primary Examiner* — Patrick F Brinson
(74) *Attorney, Agent, or Firm* — Marshall, Gerstein & Borun LLP

(57) ABSTRACT

A pipe assembly for a district heating network, comprising a first pipe, a second pipe and, surrounding the first pipe, a first insulating layer arranged to reduce heat transfer from the first pipe outwards in a radial direction, the first pipe being arranged for a first heat transfer medium flow and the second pipe being arranged for a second heat transfer medium flow. The pipe assembly comprises a heat transfer device arranged to transfer heat from an outer surface of the first insulating layer to the second pipe, and a second insulating layer arranged to reduce heat transfer from the heat transfer device and the second pipe outwards in the radial direction, the thermal conductivity of the heat transfer device being substantially better than the thermal conductivity of the first insulating layer and the thermal conductivity of the second insulating layer.

10 Claims, 1 Drawing Sheet

(51) Int. Cl.
  *F16L 59/15*  (2006.01)
  *F16L 1/00*   (2006.01)
  *F16L 9/19*   (2006.01)
  *F16L 3/22*   (2006.01)
  *F17D 1/08*   (2006.01)
  *F28D 7/00*   (2006.01)
  *F24D 10/00*  (2006.01)

(52) U.S. Cl.
  CPC .............. *F17D 1/084* (2013.01); *F28D 7/0008* (2013.01); *F28D 7/0025* (2013.01); *F28F 2270/00* (2013.01); *F24D 10/00* (2013.01)

(56) References Cited

U.S. PATENT DOCUMENTS

| | | | | |
|---|---|---|---|---|
| 3,932,727 A * | 1/1976 | True | | 392/468 |
| 4,194,536 A * | 3/1980 | Stine et al. | | 138/149 |
| 4,653,541 A * | 3/1987 | Oehlschlaeger et al. | | 138/104 |
| 5,094,088 A * | 3/1992 | Davis | | 62/393 |
| 6,213,157 B1 * | 4/2001 | Thiebaud et al. | | 138/149 |
| 7,793,689 B2 * | 9/2010 | Becker | | 138/149 |
| 7,802,445 B2 * | 9/2010 | Winters | | 62/393 |
| 7,975,727 B2 * | 7/2011 | Adler et al. | | 138/114 |
| 8,555,929 B2 * | 10/2013 | Ertel et al. | | 138/108 |
| 2009/0007594 A1 | 1/2009 | Dylla | | |

FOREIGN PATENT DOCUMENTS

| | | |
|---|---|---|
| EP | 0824204 A1 | 2/1998 |
| JP | 51039250 U | 3/1976 |
| JP | 2006170585 A | 6/2006 |
| WO | WO-2005043028 A2 | 5/2005 |

OTHER PUBLICATIONS

Finnish Patent Office Search Report, Finnish patent application No. 20115619, dated Feb. 5, 2013.

Supplementary European Search Report, European patent application No. EP12800324, dated Oct. 17, 2014.

* cited by examiner

PIPE ASSEMBLY FOR DISTRICT HEATING NETWORK

CROSS-REFERENCE TO RELATED APPLICATIONS

This is the U.S. national phase of International Application No. PCT/FI2012/050617, filed Jun. 15, 2012, which claims the benefit of Finnish Patent Application No. 20115619, filed Jun. 17, 2011.

BACKGROUND OF THE INVENTION

The invention relates to a pipe assembly for a district heating network according to the preamble of independent claim 1.

In pipework of a district heating network, some heat loss always occurs. It is known to reduce these losses by making the insulating layers of the pipework thicker.

BRIEF DESCRIPTION OF THE INVENTION

An object of the invention is to provide a cost-efficient alternative for reducing heat losses of pipework of a district heating network. The object of the invention is achieved by a pipe assembly which is characterized by what is disclosed in independent claim 1. Preferred embodiments of the invention are disclosed in the dependent claims.

The invention is based on providing a pipe assembly with a heat transfer device for recovering to a cooler second pipe a portion of heat that otherwise would become transferred from a hotter first pipe to the environment. The heat transfer device is arranged to transfer heat from an outer surface of a first insulating layer surrounding the first pipe to the second pipe. When the pipe assembly according to the invention is in use in the district heating network, the heat transfer device is used for transferring a portion of lost heat of a supply pipe to a return pipe, enabling the lost heat to be at least partly transferred to a power plant.

The pipe assembly according to the invention enables heat losses of the pipework of the district heating network to be reduced with no need to make the insulating layers thicker.

BRIEF DESCRIPTION OF THE FIGURES

The invention is now described in closer detail in connection with the preferred embodiments and with reference to the accompanying drawings, in which.

DETAILED DESCRIPTION OF THE INVENTION

Figure 1:
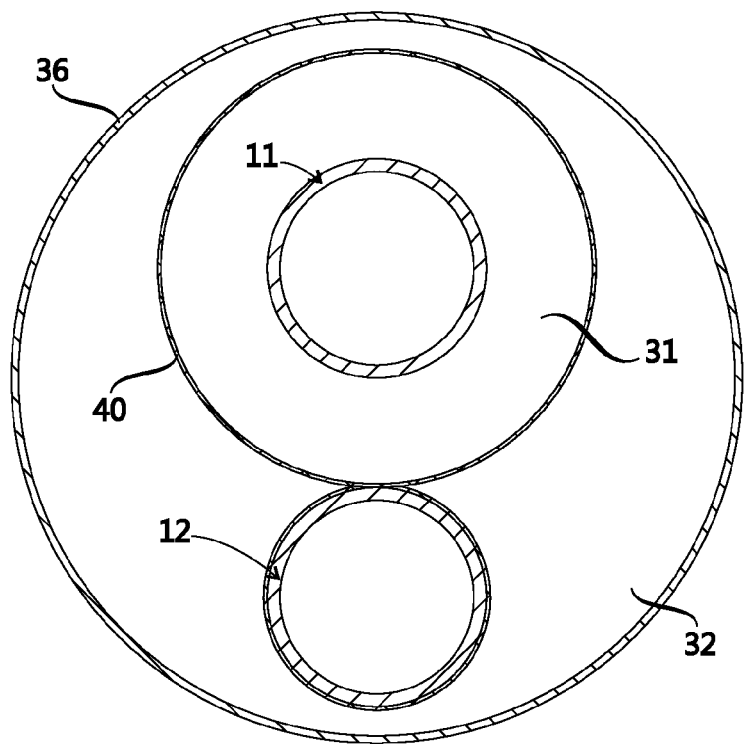
FIG. 1 shows a cross-section of a pipe assembly according to an embodiment of the invention.

FIG. 1 shows a pipe assembly for a district heating network according to an embodiment of the invention, the pipe assembly comprising a first pipe 11, a second pipe 12, an outer pipe 36, a first insulating layer 31, a second insulating layer 32, and a heat transfer device 40.

The first pipe 11 is arranged for a first heat transfer medium flow, and the second pipe 12 is arranged for a second heat transfer medium flow. The first insulating layer 31 surrounds the first pipe 11, the first insulating layer 31 being arranged to reduce heat transfer from the first pipe 11 outwards in a radial direction. The heat transfer device 40 is arranged to transfer heat from an outer surface of the first insulating layer 31 to the second pipe 12. The second insulating layer 32 is arranged to reduce heat transfer from the heat transfer device 40 and the second pipe 12 outwards in a radial direction, the thermal conductivity of the heat transfer device 40 being substantially better than the thermal conductivity of the first insulating layer 31 and the thermal conductivity of the second insulating layer 32. The outer pipe 36 surrounds the first pipe 11, the second pipe 12, the first insulating layer 31, the heat transfer device 40, and the second insulating layer 32.

The heat transfer device 40 has a cross-section of substantially the shape of a figure eight, and is situated such that the first loop of the figure eight is in contact with the outer surface of the first insulating layer 31 while the second loop of the figure eight is in contact with an outer surface of the second pipe 12. The heat transfer device 40 may comprise a plate member folded from a plate material, a mesh member folded from a mesh material, or a material layer. The plate material may comprise an aluminium plate, for instance. The mesh material may comprise an aluminium mesh, for instance. The material layer may comprise a material to be applied while manufacturing the pipe assembly onto the outer surface of the first insulating layer 31 and onto the outer surface of the second pipe 12 e.g. by spreading or spraying.

The thickness of the first insulating layer 31 is greater than the thickness of the second insulating layer 32 at a point defined by a line passing through the centres of the first pipe 11 and the second pipe 12. In the pipe assembly of FIG. 1 said point resides at the top of the figure, at an imaginary vertical centre line. It is thus not the purpose of the heat transfer device 40 to try to maximize the amount of heat energy that can be transferred from the surface of the first insulating layer 31 to the second pipe 12. Instead, the purpose is to utilize the placement of the heat transfer device 40 for cost-efficiently minimizing the amount of heat energy that becomes transferred via an outer surface of the outer pipe 36 to the environment.

By giving the heat transfer device the shape of a figure eight, a large heat transfer surface area is provided both between the heat transfer device and the outer surface of the first insulating layer and between the heat transfer device and the second pipe. In alternative embodiments of the invention, the shape of the cross-section of the heat transfer device may differ from the shape of a figure eight. In an alternative embodiment, the heat transfer device surrounds the pair consisting of the first insulating layer and the second pipe in a manner similar to that in which a bicycle chain extends round the front and rear sprocket-wheels. In such a case, the heat transfer surface area is smaller than in connection with the figure eight shape but, on the other hand, the smaller length of the cross-section of the heat transfer device reduces material costs.

The contact surface area of the heat transfer device with the first insulating layer varies in different embodiments. In many embodiments, the heat transfer device is arranged to be such that it is in contact with the outer surface of the first insulating layer at least over a distance of 180°.

The contact surface area of the heat transfer device with the second pipe also varies in different embodiments. In many embodiments, the heat transfer device is arranged to be such that it is in contact with the outer surface of the second pipe at least over a distance of 90°. On the other hand, even a small contact surface area may suffice in some embodiments. Depending on the materials of the heat transfer device and the second pipe, a contact angle of even less than 15° may be sufficient. As viewed in a direction of the circumference of the second pipe, the length of the contact area may in some embodiments be quite small, e.g. of the order of 5 mm.

The heat transfer device may be selected such that its thermal conductivity is at least thousand times the thermal conductivity of the first insulating layer and the thermal conductivity of the second insulating layer. This is easily achieved e.g. by selecting the material of the heat transfer device to be aluminium whose thermal conductivity is about 250 W/K·m, and by selecting the material of both the first insulating layer and the second insulating layer to be polyurethane whose thermal conductivity is about 0.026 W/K·m. Being a solid material, polyurethane is capable of reducing heat transfer by conduction, convection and radiation. The first and the second insulating layer may also comprise materials other than polyurethane. In some embodiments, the first insulating layer comprises different materials than the second insulating layer.

Polyurethane installed around the pipe reduces heat transfer substantially equally well both in a radial and in an axial direction. If a heat insulation is used whose heat insulation capacity is different in different directions, the heat insulation is preferably installed such that the heat insulation capacity is at its best in the radial direction.

The heat transfer medium used in district heating networks is nearly always water, most often in a liquid state. Consequently, in a pipe assembly according to the invention to be used in a typical district heating network, both the first pipe and the second pipe are arranged for a flow of liquid water. Both the first pipe and the second pipe may be a steel pipe. Alternatively, both the first pipe and the second pipe may be a plastic pipe. It is also possible that the first pipe and the second pipe are made of different materials. In an alternative embodiment, the first pipe is a steel pipe and the second pipe is a plastic pipe. Pipe materials other than steel and plastic may also be used.

In an embodiment of the invention, the materials for the pipe assembly are selected such that the thermal conductivity of the heat transfer device is at least three times the thermal conductivity of the material of the first pipe and the thermal conductivity of the material of the second pipe. This is achieved e.g. by selecting the material of the heat transfer device to be aluminium, and the material of the first and the second pipe to be steel.

In the pipe assembly shown in FIG. 1, the inner diameter of the second pipe 12 is substantially the same as the inner diameter of the first pipe 11. Such dimensioning is useful in modern district heating networks where substantially the same volume flow of the heat transfer medium returns to the power plant via the second pipe as is supplied to a site of use via the first pipe. In connection with the present invention, a power plant refers to a plant from which a first heat transfer medium flow is supplied and to which a second heat transfer medium flow returns. A power plant may thus be e.g. a thermal power station or a power plant producing both electricity and heat.

In the embodiment of FIG. 1, both the outer surface of the cross-section of the first insulating layer 31 and the outer surface of the cross-section of the outer pipe 36 are circular in shape. In alternative embodiments of the invention, the first insulating layer may be shaped such that it comprises a depression at the second pipe, in which case the first insulating layer is slightly thinner in the vicinity of the second pipe than elsewhere. In alternative embodiments, the shape of the cross-section of the outer pipe may differ from the circular one such that the thickness of the second insulating layer is substantially similar everywhere on the first insulating layer and on the second pipe. As compared with the embodiment of FIG. 1, this would mean making the second insulating layer thinner in an area where the first insulating layer is located beside the second pipe.

Trunk lines of a district heating network are often built such that a supply pipe and a return pipe are pipes separate from one another, i.e. they are not located inside a common outer pipe. When the supply pipe and the return pipe are separate pipes, both the supply pipe and the return pipe may be provided with a lost heat collection pipe, in which case the heat transfer device is arranged to transfer heat from the outer surface of the first insulating layer surrounding the supply/return pipe to the lost heat collection pipe.

Figure 2:
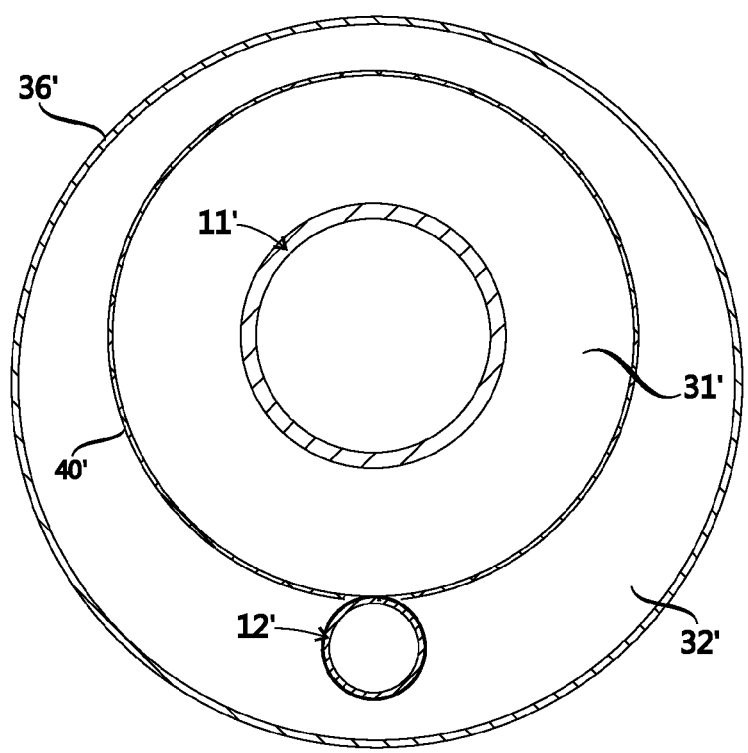
FIG. 2 shows a cross-section of a pipe assembly according to another embodiment of the invention.

FIG. 2 shows a separate pipe assembly according to an embodiment of the invention, the pipe assembly comprising a first pipe 11', a second pipe 12', an outer pipe 36', a first insulating layer 31', a second insulating layer 32', and a heat transfer device 40'. From the pipe assembly of FIG. 1 the embodiment of FIG. 2 differs in that the inner diameter of the second pipe 12' is substantially smaller than the inner diameter of the first pipe 11'. The first pipe 11' is arranged for a flow of hot supply water from a power plant, and the second pipe 12' is arranged for a flow of water from a lost heat collection circle. The pipe assembly according to FIG. 2 may also be used as a return pipe, in which case the first pipe 11' is arranged for a flow of cooled return water returning from a site of consumption to the power plant, and the second pipe 12' is arranged for a flow of water from a lost heat collection circle. The flow direction in the lost heat collection circle may be opposite to that of the main flow of the district heating network.

A district heating network including a pipe assembly according to the invention may be provided with one or more heat pumps arranged to recover heat energy from the first heat transfer medium flow of the first pipe, thus reducing the temperature of the second heat transfer medium flow of the second pipe. In an embodiment, the heat pump is arranged to reduce the temperature of the second heat transfer medium flow to be the same as or lower than the ambient temperature, in which case no thermal loss occurs in the second pipe at all. Herein, ambient temperature refers to the ambient temperature of the second pipe, i.e. depending on the embodiment, to the temperature of the ground in which the pipe assembly including the second pipe is installed, for instance.

The district heating network whose pipework is implemented using pipe assemblies according to the invention may be provided with a heat pump for each customer. In such a case, in connection with a heat exchanger of each customer of the district heating network, a heat pump is provided which takes out heat energy from the district heating network for the customer's use and simultaneously reduces the temperature of the return flow.

It will be obvious to a person skilled in the art that the basic idea of the invention may be implemented in many different ways. The invention and its embodiments are thus not restricted to the examples described above but may vary within the scope of the claims.

The invention claimed is:

1. A pipe assembly for a district heating network, comprising a first pipe, a second pipe, a heat transfer device and, surrounding the first pipe, a first insulating layer that is arranged to reduce heat transfer from the first pipe outwards in a radial direction, the first pipe being arranged for a first heat transfer medium flow, the second pipe being located outside the first insulating layer in radial direction and arranged for a second heat transfer medium flow, and the heat transfer device being arranged to transfer heat from an outer surface of the first insulating layer to the second pipe, wherein the pipe assembly further comprises a second insulating layer arranged to reduce heat transfer from the heat transfer device and the second pipe outwards in the radial direction, wherein the thermal conductivity of the heat transfer device is at least one thousand times the thermal conductivity of the first insulating layer.

2. A pipe assembly as claimed in claim 1, wherein the heat transfer device comprises one or more of the following: plate member, mesh member, material layer.

3. A pipe assembly as claimed in claim 2, wherein the heat transfer device has a cross-section of substantially the shape of a figure eight, and is situated such that the first loop of the figure eight is in contact with the outer surface of the first insulating layer while the second loop of the figure eight is in contact with an outer surface of the second pipe.

4. A pipe assembly as claimed in claim 1, wherein the thermal conductivity of the heat transfer device is at least three times the thermal conductivity of the material of the first pipe and at least three times the thermal conductivity of the material of the second pipe.

5. A pipe assembly as claimed in claim 1, wherein both the first pipe and the second pipe are arranged for a flow of liquid water.

6. A pipe assembly as claimed in claim 1, wherein both the first pipe and the second pipe are steel pipes.

7. A pipe assembly as claimed in claim 1, wherein both the first insulating layer and the second insulating layer comprise polyurethane.

8. A pipe assembly as claimed in claim 1, wherein the pipe assembly comprises an outer pipe which surrounds the first pipe, the second pipe, the first insulating layer, the heat transfer device, and the second insulating layer.

9. A pipe assembly for a district heating network that has:
   a first pipe;
   a first insulating layer that surrounds the first pipe and is arranged to reduce heat transfer from the first pipe outwards in a radial direction;
   a second pipe that is located radially outside the first insulating layer and is arranged for a second heat transfer medium flow;
   a heat transfer device that is arranged to transfer heat from an outer surface of the first insulating layer to the second pipe; and
   a second insulating layer that is arranged to reduce heat transfer from the heat transfer device and the second pipe outwards in the radial direction;
   wherein the thermal conductivity of the heat transfer device is at least one thousand times the thermal conductivity of the second insulating layer.

10. A pipe assembly as claimed in claim 9, in which the thermal conductivity of the heat transfer device is also at least one thousand times greater than the thermal conductivity of the first insulating layer.

* * * * *